(12) United States Patent
Yu

(10) Patent No.: US 9,485,687 B2
(45) Date of Patent: Nov. 1, 2016

(54) SELECTIVE COMPRESSION IN A WIRELESS COMMUNICATION SYSTEM

(71) Applicant: Exalt Communications Incorporated, Campbell, CA (US)

(72) Inventor: John Yu, Saratoga, CA (US)

(73) Assignee: Exalt Wireless, Inc., Campbell, CA (US)

( * ) Notice: Subject to any disclaimer, the term of this patent is extended or adjusted under 35 U.S.C. 154(b) by 323 days.

(21) Appl. No.: 13/769,207

(22) Filed: Feb. 15, 2013

(65) Prior Publication Data

US 2014/0233376 A1 Aug. 21, 2014

(51) Int. Cl.
*H04W 28/06* (2009.01)

(52) U.S. Cl.
CPC .................................. *H04W 28/06* (2013.01)

(58) Field of Classification Search
CPC ....... H04W 28/06; H04L 47/10; H04L 47/35
USPC .................................................. 370/230, 235
See application file for complete search history.

(56) References Cited

U.S. PATENT DOCUMENTS

| | | | | |
|---|---|---|---|---|
| 6,327,476 B1* | 12/2001 | Koscal | ........................ | 455/462 |
| 6,625,671 B1* | 9/2003 | Collette | .............. | G06F 13/4059 710/20 |
| 6,947,483 B2* | 9/2005 | Engwer | ........................ | 375/240 |
| 7,692,561 B2* | 4/2010 | Biran et al. | ..................... | 341/51 |
| 7,779,443 B2* | 8/2010 | Kim | ............................... | 725/81 |
| 7,898,442 B1* | 3/2011 | Sovik | ............................... | 341/51 |
| 8,238,346 B2* | 8/2012 | Howe et al. | ............. | 370/395.42 |
| 8,565,234 B1* | 10/2013 | Mizrahi | ................. | H04L 49/201 370/254 |
| 8,837,442 B2* | 9/2014 | Inoue et al. | ................... | 370/338 |
| 2002/0038338 A1* | 3/2002 | Yen et al. | ..................... | 709/203 |
| 2002/0091905 A1* | 7/2002 | Geiger et al. | ................. | 711/170 |

(Continued)

FOREIGN PATENT DOCUMENTS

| EP | 0714172 A2 * | 5/1996 |
|---|---|---|
| EP | 1501228 A1 * | 1/2005 |

OTHER PUBLICATIONS

Vosoughi et al., "Baseband Signal Compression in Wireless Base Stations", Global Communications Conference (GLOBECOM), 2012 IEEE, dated Dec. 2012, 6 pages.

(Continued)

*Primary Examiner* — Mark Rinehart
*Assistant Examiner* — Natali N Pascual Peguero
(74) *Attorney, Agent, or Firm* — Hickman Palermo Becker Bingham LLP; Malgorzata A. Kulczycka

(57) ABSTRACT

Techniques for compressing data in a wireless network are provided. Data may be in the form of data packets that have one or more headers and a payload. One or more compression initiation criteria are used to determine whether to compress all data or certain data. Different data may be associated with different classes of service. Compression initiation criteria for data that belongs to one class of service may be different than compression initiation criteria for data that belongs to another class of service. Compression initiation criteria for data may be different than one or more compression halting criteria that are used to determine whether to cease compressing data. One type of compression involves use of synchronized history buffers. A wireless receiver may communicate with a wireless transmitter that an error is detected and that the history buffers of the wireless transmitter should be flushed or cleared.

20 Claims, 5 Drawing Sheets

(56) References Cited

U.S. PATENT DOCUMENTS

| | | | |
|---|---|---|---|
| 2002/0168945 A1* | 11/2002 | Hwang et al. | 455/69 |
| 2002/0191692 A1* | 12/2002 | Fallon et al. | 375/240 |
| 2004/0233845 A1* | 11/2004 | Jeong et al. | 370/230 |
| 2006/0075134 A1* | 4/2006 | Aalto et al. | 709/238 |
| 2007/0248071 A1* | 10/2007 | Hui et al. | 370/345 |
| 2008/0101220 A1* | 5/2008 | Kim et al. | 370/229 |
| 2010/0142560 A1* | 6/2010 | Sharivker et al. | 370/475 |
| 2010/0329255 A1* | 12/2010 | Singhal et al. | 370/392 |
| 2012/0184322 A1* | 7/2012 | Falconetti et al. | 455/524 |
| 2012/0284239 A1* | 11/2012 | Agarwala | G06F 3/0608 707/693 |

OTHER PUBLICATIONS

Duarte et al., "Signal Compression in Wireless Sensor Networks" from the internet http://rsta.royalsocietypublishing.org/content/370/1958/118, dated Nov. 28, 2011, 24 pages.

* cited by examiner

SELECTIVE COMPRESSION IN A WIRELESS COMMUNICATION SYSTEM

FIELD OF THE INVENTION

The present invention relates to data communication and, more specifically, to techniques for compressing data traffic in a wireless communication system.

BACKGROUND

Compression techniques have been applied to wireless networks to increase network bandwidth. However, compressing data packets prior to transmitting wireless signals increases latency. One approach for compressing data packets may involve finding strings that match a previous data packet, encoding the matching strings, and then decoding the encoded strings on the receiving side of the wireless network. While the increased bandwidth due to the reduced amount of data is desirable, the extra latency, especially to latency-sensitive traffic, neutralizes the benefit of compression.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
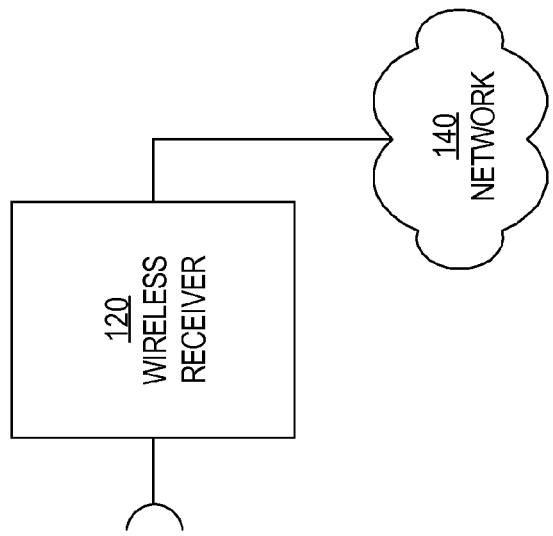
FIG. 1 is a block diagram that depicts a communication system that includes wireless and wired components, in an embodiment.
Figure 1:
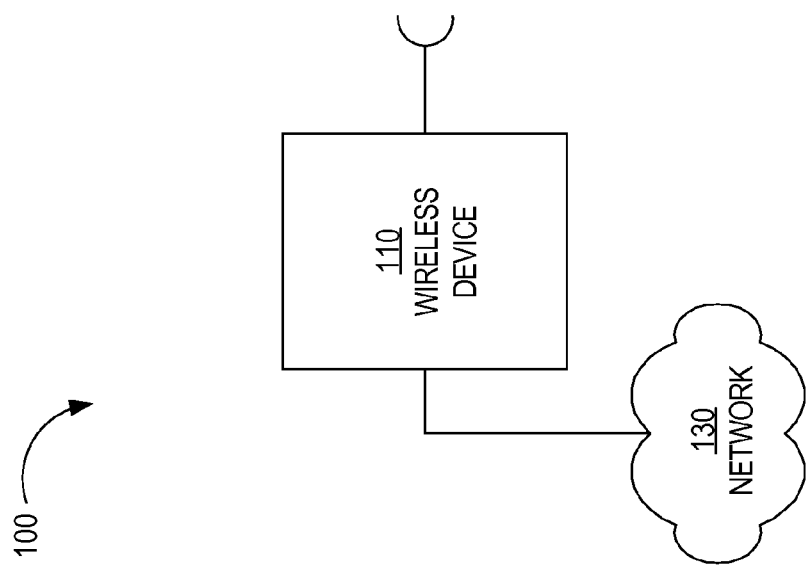

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for selectively compressing data that is to be transmitted over a wireless network. Instead of always foregoing compression or always having data compression "turned on," data from a data network is compressed when needed before generating and transmitting radio signals that represent the data. One or more conditions or criteria must be satisfied in order for compression to be initiated. Compression may be "turned on" based on detecting a difference between the throughput of incoming data packets and the throughput of radio transmission of signals that represent data packets. This difference may be reflected in the length of one or more queues that hold data packets that are waiting to be converted into radio signals.

Furthermore, different data traffic may be associated with or belong to different classes of service. Different classes of service may be associated with different compression thresholds that dictate when data from the corresponding class of service is to be compressed. Thus, for example, data associated with a first class of service is compressed when the associated throughput is at 50 Mbps (megabits per second) and data associated with a second class of service is compressed when the associated throughput is at 100 Mbps. Thus, the first class of service may be considered more important than the second class of service.

Typical compression techniques are applied primarily in the file storage context. In that context, considerations that are typically used when determining whether to compress files include CPU and memory usage. However, in the context of embodiments of the invention, determining whether to compress is based on network bandwidth and, optionally, class of service of different data packets.

While the following description refers to radio signals, the radio signals instead may be microwave signals. Embodiments of the invention are not limited to transmitting any particular type of signal, whether radio wave, microwave, or other type.

Also, while the following description refers to data compression that uses synchronized history buffers, embodiments of the invention are not limited to any particular data compression technique. Other lossless data compression techniques may be used to compress data before the radio signals are generated based on the compressed data and transmitted to a wireless receiver.

Communication Protocol Agnosticism

Techniques described herein are agnostic to the particular suite of communications protocols used. The techniques described herein are not limited to use in conjunction with any particular communication protocol suite. Thus, although a communicant may use the techniques described herein in conjunction with TCP, IP, and Ethernet protocol, embodiments of the invention can be used in conjunction with any set of communication protocols. Techniques described herein may be used in a broad variety of scenarios without making any assumptions as to the suite of communication protocols that any communicant will use. Techniques described herein may be used without making any assumption as to the type of data traffic which will be flowing through a network.

One embodiment of the invention is described in conjunction with the use of Ethernet protocol. Although the Ethernet protocol embodiment is discussed herein, alternative embodiments of the invention may be implemented to use protocols other than Ethernet protocol.

Communication System Overview

FIG. 1 is a block diagram that depicts a communication system 100 that includes wireless and wired components, in an embodiment. Communication system 100 includes a wireless transmitter 110, a wireless receiver 120, a network 130, and a network 140. Wireless transmitter 110 is communicatively coupled to network 130 and wireless receiver 120 is communicatively coupled to network 140. Wireless transmitter 110 receives data (e.g., in the form of data packets) that is routed through network 130, generates radio signals based on the data, and transmits the radio signals to wireless receiver 120. Wireless receiver 120 receives radio signals from wireless transmitter 110, generates data packets based on the radio signals, and sends the generated data packets to one or more nodes in network 140. Similarly, wireless receiver 120 is configured to act as wireless transmitter 110 and vice versa. Specifically, wireless receiver 120 receives data packets that are routed through network 140, generates radio signals based on the data packets, and transmits the radio signals to wireless transmitter 110. Wireless transmitter 110 receives radio signals from wireless receiver 120, generates data packets based on the radio signals, and sends the generated data packets to one or more nodes in network 130.

Although only one wireless transmitter 110 is depicted in FIG. 1, communication system 100 may include multiple wireless transmitters that are communicatively coupled to network 130. Similarly, although only one wireless receiver 120 is depicted in FIG. 1, communication system 100 may include multiple wireless receivers that are communicatively coupled to network 140. In this embodiment, the multiple wireless receivers may be able to receive wireless signals from and transmit wireless signals to each of the multiple wireless transmitters.

Compression System

Figure 2:
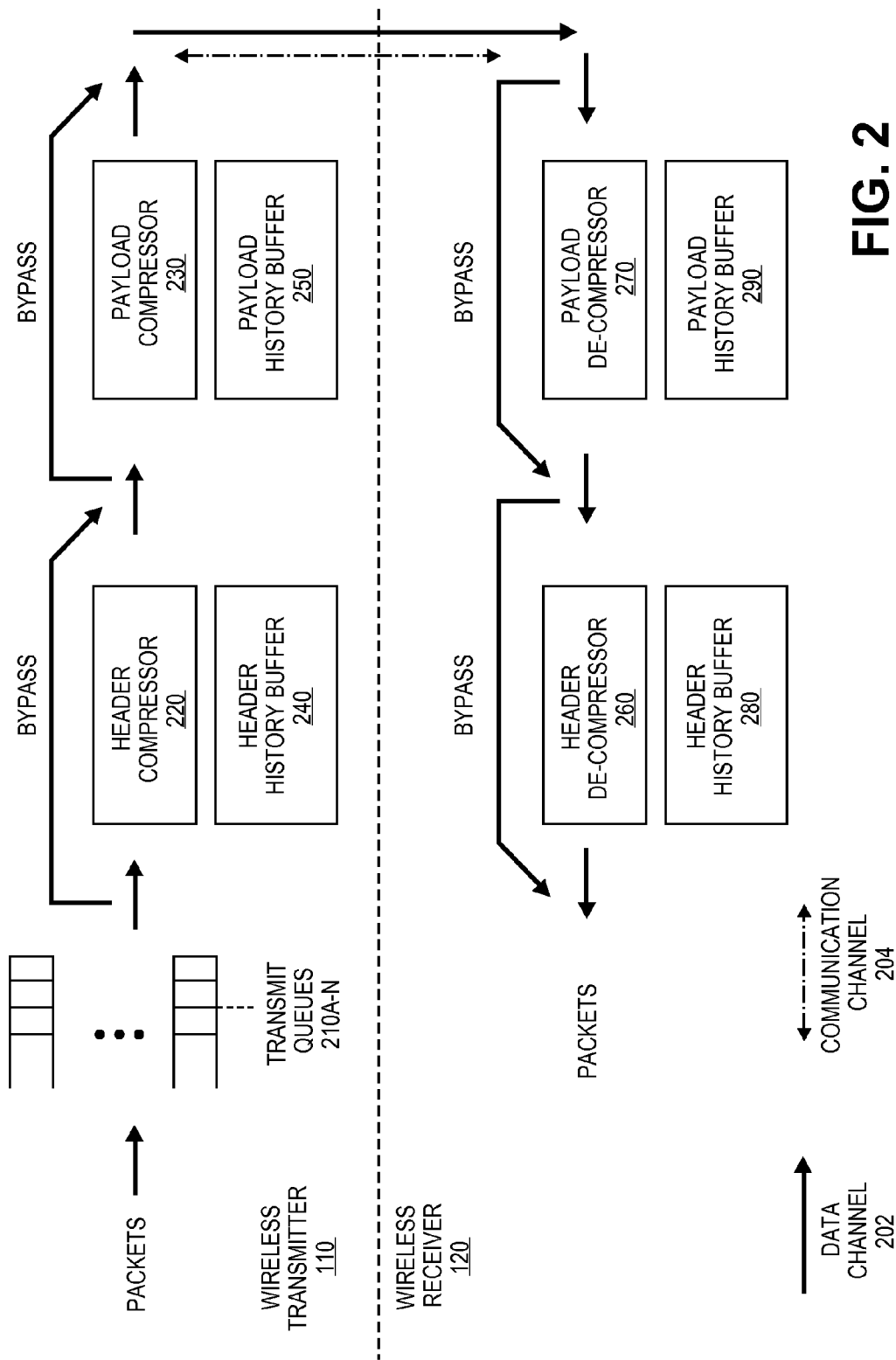
FIG. 2 is a block diagram that depicts components of a wireless transmitter and a wireless receiver, in an embodiment.

FIG. 2 is a block diagram that depicts components of wireless transmitter 110 and wireless receiver 120, in an embodiment. The same components that are within wireless transmitter 110 may also be found in wireless receiver 120.

Components of wireless transmitter 110 include transmit queues 210A-N, a header compressor 220, a payload compressor 230, a header history buffer 240, and a payload history buffer 250. Wireless transmitter 110 also includes a signal generator (not shown) that generates wireless signals based on digital data (whether or not compressed) and a transmitter (not shown) that transmits the generated wireless signals over one or more radio frequencies.

As noted previously, any lossless compression technique may be used to compress data prior to generating radio signals based on the compressed data and transmitting the radio signals to wireless receiver 120. Thus, some embodiments may not utilize a history buffer in order to compress data. In the depicted embodiment, however, data compression involves use of one or more history buffers. How history buffers 240 and 250 are used is described in more detail below.

While depicted as separate components, transmit queues 210A-N, header compressor 220, payload compressor 230, header history buffer 240, and payload history buffer 250 may be implemented on a single computing device or on different computing devices that are communicatively coupled to each other. Also, header compressor 220 and payload compressor 230 may be implemented in software, hardware, or a combination of software and hardware.

In an embodiment, wireless transmitter 110 does not include header compressor 220 and payload compressor 230. Instead, wireless transmitter 110 includes a single compressor. The single compressor treats all the data (whether the data originates from a header or a payload portion of a data packet) the same. In this embodiment, a single history buffer replaces header history buffer 240 and payload history buffer 250.

Components of wireless receiver 120 include header decompressor 260, payload decompressor 270, header history buffer 280, and payload history buffer 290. Wireless transmitter 110 also includes a signal generator (not shown) that generates wireless signals based on digital data (whether or not compressed) and a transmitter (not shown) that transmits the generated wireless signals over one or more radio frequencies.

While depicted as separate components, header decompressor 260, payload decompressor 270, header history buffer 280, and payload history buffer 290 may be implemented on a single computing device or on different computing devices that are communicatively coupled to each other. Also, header decompressor 260 and payload decompressor 270 may be implemented in software, hardware, or a combination of software and hardware.

Transmit Queues

As noted previously, wireless transmitter 110 receives (e.g., Ethernet) data packets from network 130. For each of multiple data packets, wireless transmitter 110 determines which queue of transmit queues 210A-N to which to enqueue the data packet. This determination may be based on one or more criteria. Such criteria may be class of service to which the data packet belongs, a size of the data packet, a type of the media that the data packet carries (e.g., audio, video, or text), etc. Thus, for example, data packets that are associated with a first class of service are enqueued to transmit queue 210A while data packets that are associated with a second class of service are enqueued to transmit queue 210B. The second class of service may be considered higher in priority or importance relative to the first class of service.

In this way, wireless transmitter 110 treats first data that is classified as belonging to a first class of service differently than second data that is classified as belonging to a second class of service. As a result, wireless transmitter 110 may determine to compress data that belongs to the first class of service while determining not compress data that belongs to the second class of service due to the fact that the second class of service is deemed a higher priority than the first class of service.

One reason why data that belongs to a class of service that has relatively higher priority than another class of service is because compression introduces latency. It takes time to compress data and decompress compressed data. Applications that use data that belongs to a lower class of service may be tolerant of delays, whereas other applications do not. Such applications (e.g., that require streaming video) may have associated data associated with a higher class of service so that that data is less likely to be compressed relative to data that is associated with a lower class of service.

The class of service to which a data packet belongs may be indicated in the data packet itself, such as via a flag or value reflected in a header of the data packet. Thus, wireless transmitter 110 analyzes the data packet (or, more specifically, a header thereof) and determines, from among transmit queues 210A-N, a queue that best matches the class of service. Wireless transmitter 110 may use a mapping that maps different values (indicated in data packets) to different classes of services. Additionally or alternatively, if a data packet contains a particular flag or if a certain bit in the data packet is set, then the data packet is enqueued into a particular queue of transmit queues 210A-N.

As noted previously, media type is another example of criteria that is used to enqueue data packets to one of transmit queues 210A-N. For example, data packets that contain video or audio data are enqueued to transmit queue 210A while data packets that do not contain video or audio data are enqueued to transmit queue 210B. Typically, video and audio data are part of latency-sensitive traffic. Accordingly, data packets that contain video and audio data are segregated from other data traffic to ensure that data packets with video or audio data are less likely to be compressed in order to avoid compression-induced latency.

In embodiment, wireless transmitter 110 only includes a single queue instead of multiple transmit queues 210A-N. In this way, all data traffic that wireless transmitter 110 receives is added to the single queue. Thus, a single threshold is used to determine whether to compress data packets that are enqueued in the single queue.

Compression Initiation Criteria

In an embodiment, each of transmit queues 210A-N is associated with one or more different compression initiation criteria. "Compression initiation criteria" is one or more criteria that wireless transmitter 110 uses to determine whether to compress one or more data packets. Compression initiation criteria may be based solely on information about the data packets in the corresponding queue or may be also based on information about the transmission of radio signals. As an example of the latter, compression initiation criteria associated with transmit queue 210A may take into account a throughput of data packets being enqueued to transmit queue 210A and a throughput of data packets being dequeued from transmit queue 210A. The respective throughputs may be calculated over a period of time, which may be in milliseconds, seconds, or minutes. If the former throughput is greater than the latter throughput, then data packets in transmit queue 210A will be compressed. Alternatively, the latter throughput may be throughput of wireless transmission of wireless transmitter 110. For example, data packets in transmit queue 210A are compressed only if the throughput of wireless transmission is 110% faster than the rate at which data packets are being enqueued to transmit queue 210A.

Another example of compression initiation criteria is the size of the corresponding transmit queue. The size of a transmit queue is also referred to as the queue's "depth." For example, if it is determined that the queue depth of transmit queue 210A is 50 MB of data, then data packets in transmit queue 210A are compressed prior to generating signals based on the data packets.

Another example of compression initiation criteria is the number of data packets in the corresponding queue. For example, if it is determined that transmit queue 210A contains ten or more data packets, then data packets in transmit queue 210A are compressed prior to generating signals based on the data packets.

Compression initiation criteria may be "hard-coded" or may be user programmable. Thus, for example, a user may be able to configure compression initiation criteria of one or more of transmit queues 210A-N. If a user determines that one or more performance metrics are not being satisfied with the current compression initiation criteria, then the user may adjust the current compression initiation criteria such that compression occurs more or less often (e.g., for certain types of data traffic of for all data traffic) given the same amount of data traffic.

When one or more compression initiation criteria are satisfied, then wireless transmitter 110 is considered to be in a "compression state" where one or more compression techniques are performed. The compression state may only be applicable to certain traffic, such as data that belongs to a certain class (or classes) of service. Thus, wireless transmitter 110 may be considered to be in a compression state for some data traffic and in an non-compression state for other data traffic.

Compression Halting Criteria

In an embodiment, compression ceases after data packets have been compressed for an amount of time. Determining when to cease compression of data packets may be based on one or more criteria. Such criteria are referred to herein as "compression halting criteria." Compression halting criteria may include the same criteria that are used to determine whether to compress the data packets. For example, if a compression threshold is 50 MB of data in transmit queue 210A, then, when the amount of data in transmit queue 210A falls below 50 MB, compression halts until transmit queue 210A contains 50 MB of data. As another example, if a compression threshold of transmit queue 210A is the equality of throughput of data packets to transmit queue 210A compared to throughput of data packets from transmit queue 210A, then, when the throughput of data packets to transmit queue 210A becomes less than the throughput of data packets from transmit queue 210A, compression halts.

Alternatively, compression halting criteria associated with a particular queue is different than compression initiation criteria associated with the particular queue. For example, a compression halting criterion of transmit queue 210A is the lapse of a particular amount of time while a compression initiation criterion of transmit queue 210A is the queue depth of transmit queue 210A. As another example, a compression halting criterion of transmit queue 210A is transmit queue 210A containing 50 MB of data while a compression initiation criterion of transmit queue 210A is transmit queue 210 containing 60 MB of data. As another example, compression initiation criteria of transmit queue 210A is transmit queue 210A having a queue depth of 50 MB and throughput of data transmitted from wireless transmitter 110 being less than the throughput of data received at wireless transmitter 110, while compression halting criteria of transmit queue 210A is transmit queue 210 having a queue depth of 50 MB and throughput of data transmitted from wireless transmitter 110 being greater than the throughput of data received at wireless transmitter 110.

Compression halting criteria may be "hard-coded" or may be user programmable. Thus, for example, a user may be able to configure compression halting criteria of one or more of transmit queues 210A-N.

When one or more compression halting criteria are satisfied, wireless transmitter 110 is said to enter (or re-enter) a "non-compression state." If wireless transmitter 110 was in a compression state for only certain data traffic (and not for other data traffic) and it is determined that one or more compression halting criteria associated with that data traffic are satisfied, then wireless transmitter 110 enters a non-compression state with respect to that type of data traffic.

Dequeuer

In an embodiment, wireless transmitter 110 includes one or more dequeuers (not depicted). A dequeuer is a component that dequeues data (e.g., a data packet) from a transmit queue and passes the data to (a) header compressor 220 and/or payload compressor 230 or (b) to a radio signal generator, effectively bypassing compressors 220 and 230. A dequeuer may be implemented in software, hardware, or a combination of software and hardware. A dequeuer may be implemented as part of compressor 220 or compressor 230 or may be implemented separately from compressors 220 and 230.

Wireless transmitter 110 may include a single dequeuer regardless of the number of transmit queues that exist for wireless transmitter 110. Alternatively, a different dequeuer may exist for each of transmit queues 210A-N.

A dequeuer determines whether compression is "turned on" or "off" (whether for a particular transmit queue or for the entire wireless transmitter 110). The dequeuer may make this determination by checking a compression indicator. A compression indicator may be implemented as a single bit flag in memory. A compression indicator may exist for each transmit queue of transmit queues 210A-N. If compression is "turned on" for, for example, transmit queue 210A, then the dequeuer for that queue passes data from transmit queue 210A to header compressor 220 and/or payload compressor 230. If not, then the dequeuer passes data from transmit queue 210A to a radio signal generator (not depicted) of wireless transmitter 110, effectively bypassing compressors 220 and 230.

If wireless transmitter 110 includes multiple transmit queues (as depicted in FIG. 2) and there is a single dequeuer, the dequeuer may use one or more techniques in determining which transmit queue from which to dequeue next. One example technique is a round-robin technique where the dequeuer rotates through transmit queues 210A-N one by one in a round-robin fashion. A variation of this technique is referred to as weighted round robin where dequeuer dequeues more data from transmit queues associated with higher priority (or higher class of service) than from transmit queues associated with lower priority. For example, the dequeuer may dequeue ten data packets from transmit queue 210A and then dequeue one data packet from transmit queue 210B.

Another example dequeue technique is referred to as "straight" priority where if there are any data packets in the highest priority transmit queue than those data packets are processed before any data packets that are in any of the other transmit queues. Thus, if there are multiple levels of priority, then the data packets from the lowest priority transmit queue will only be processed (for radio transmission) if there are no data packets in any of the higher priority transmit queues.

Compressors

As noted previously, wireless transmitter 110 includes header compressor 220 and payload compressor 230. Header compressor 220 compresses one or more headers of a data packet. For example, if data packet is an Ethernet data packet, then header compressor 220 may compresses the Ethernet header, a layer 3 (e.g., IP) header, and a layer 4 (e.g., UDP or TCP) header.

Header compressor 220 (or another component of wireless transmitter 110) stores, in header history buffer 240, one or more headers that are to remain in sync with wireless receiver 120. In other words, the one or more headers stored in header history buffer 240 will also be stored in header history buffer 280 of wireless receiver 120. In an embodiment, wireless transmitter 110 includes multiple compressors (whether header compressors, payload compressors, or both), where each compressor is associated with its own buffer. In this embodiment, the number of transmit queues may vary from one to many. Having multiple compressors speeds up compression. In this embodiment, each compressor in wireless transmitter 110 has a corresponding decompressor in wireless receiver 120.

Later, header compressor 220 receives an uncompressed header to be compressed. In response to receiving an uncompressed header that is to be compressed, header compressor 220 compares the uncompressed header to data in header history buffer 240 (or "history buffer data") in order to find a set of one or more matches, such as sequences of characters or bytes in the uncompressed data that exactly match sequences of characters or bytes in the history buffer data. Header compressor 220 finds the matches and replaces matching characters/bytes with data that indicates offsets into header history buffer 240. For example, the data may be a set of offset-length pairs. Thus, two values (e.g., one or more bytes) may replace many bytes worth of data. This approach is referred to as run-length encoding.

Payload compressor 230 compresses the payload of data packets, including, for example, compressed or uncompressed headers, payloads, and CRC (Cyclic Redundancy Check). Payload compressor 230 (or another component of wireless transmitter 110) stores, in payload history buffer 250, stores packet data that is to remain in sync with wireless receiver 120. In other words, the payload data stored in payload history buffer 250 will also be stored in payload history buffer 290 of wireless receiver 120. Payload compressor 230 may operate similarly to header compressor 220, except that payload compressor 230 utilizes payload history buffer 250 instead of header history buffer 240.

Compressed data (whether a compressed header or a compressed payload) that results from the history buffer technique described herein may consist of compressed and uncompressed data. In other words, some portion of the initial uncompressed data may not match any portion (or any significant portion) of data in a history buffer. Thus, a set of compressed data may indicate, for each portion of the set of compressed data, whether the portion is compressed or uncompressed.

The amount of payload data in payload history buffer 250 may vary from one implementation to another. For example, N bytes of a data packet are stored in payload history buffer 250, where N is chosen in order to optimize compression speed and compression ratio. The value 'N' may be a few Kilobytes. Thus, payload history buffer 250 may contain data from a single data packet or multiple data packets.

Decompressors

As noted previously, wireless receiver 120 includes header decompressor 260 and payload decompressor 270. Header decompressor 260 decompresses one or more headers of a data packet. For example, if data packet is an Ethernet data packet, then header decompressor 260 may decompresses the Ethernet header, a layer 3 (e.g., IP) header, and a layer 4 (e.g., UDP or TCP) header.

If a compressed header includes a set of offset-length pairs, then, for each offset-length pair, header decompressor 260 identifies a first location in header history buffer 280 based on the offset and reads a portion of header history buffer 280 beginning at the first location and ending at a second location indicated by the length. As noted previously, one or more portions of a compressed header may be uncompressed. For such portions, a lookup into header history buffer 280 is not necessary.

Payload decompressor 270 decompresses data packets, including compressed or uncompressed headers, payloads and CRC. Payload decompressor 270 operates similarly to header decompressor 260, except that payload decompressor 270 utilizes payload history buffer 290 to decompress compressed data rather than header history buffer 280. As noted previously, one or more portions of a compressed payload may be uncompressed. For such portions, a lookup into payload history buffer 290 is not necessary.

Header Compression V. Payload Compression

In an embodiment, a header of a data packet is compressed while the payload of the data packet remains uncompressed. This situation may occur if the data packet is considered important enough that "full" compression may cause too much latency but "partial" compression may help speed up data transmission.

In a related embodiment, a transmit queue is associated with two or more different sets of one or more compression initiation criteria. If a first set of one or more compression initiation criteria is satisfied, then header compression is performed but not payload compression. Then, if a second set of one or more compression initiation criteria is satisfied, then both header compression and payload compression are performed.

For example, if it is determined that transmit queue 210A has a queue depth of 50 MB, then header compression only is initiated. Then, if it is determined that transmit queue 210A has a queue depth of 60 MB (while header compression is performed on headers of data packets), then payload compression is also initiated.

In a related embodiment, one or more of transmit queues 210A-N may contain data packets for which payload compression should never be performed. For example, for some latency sensitive data packets, only header compression is allowed while payload compression is prohibited. Thus, the one or more compression initiation criteria associated with a transmit queue may only be applicable to headers of data packets enqueued to that transmit queue.

Multiple Channels

As noted above, wireless transmitter 110 transmits radio signals to wireless receiver 120 over data channel 202. The radio signals are generated from data packets received through network 130. In an embodiment, wireless transmitter 110 and wireless receiver 120 communicate with each other over communication channel 204. The radio signals transmitted and received over communication channel 204 pertain to the compressed data reflected in the radio signals transmitted over data channel 202.

Channels 202 and 204 may correspond to different frequencies (or sets of frequencies) over which radio signals are transmitted. Alternatively, channels 202 and 204 communicate through the same physical channel or radio frequency. In this embodiment, a few indicator bits are added before each packet to indicate information about the packet. Thus, channel 204 corresponds to the indicator bits while channel 202 corresponds to the packet data.

Data communicated over communication channel 204 may be on a per packet basis. Examples of such data include an indication of whether a corresponding header is compressed, an indication of whether a corresponding payload is compressed, an indication of whether a header history buffer on wireless receiver 120 is to be updated, and an indication of whether a payload history buffer on wireless receiver 120 is to be updated.

For example, a first radio signal transmitted from wireless transmitter 110 over data channel 202 corresponds to a header of a particular data packet. At or around the same time, a second radio signal transmitted from wireless transmitter 110 over communication channel 204 indicates that the header of the particular data packet is uncompressed.

As another example, a first radio signal transmitted from wireless transmitter 110 over data channel 202 corresponds to a payload of a particular data packet. At or around the same time, a second radio signal transmitted from wireless transmitter 110 over communication channel 204 indicates that the payload history buffer (i.e., buffer 290) should be updated with the payload of the particular data packet.

A per-packet indication (e.g., whether a data packet is compressed or whether a history buffer on a receiver should be updated) may be reflected in a radio signal (over communication channel 204) that is based on a single bit of data. For example, the "second radio signal" in the most recent example may correspond to a single bit that is either a '0' or '1.' Similarly, the second radio signal may correspond to multiple bits, where one of the bits indicates whether a corresponding data packet is compressed and another of the bits indicates whether a history buffer should be updated with the corresponding data packet. The corresponding data (i.e., over data channel 202) may be analyzed to determine whether the corresponding data is a header portion or a payload portion of a data packet.

Synchronizing History Buffers

In an embodiment, wireless transmitter 110 sends, over communication channel 204, a synchronization instruction to instruct wireless receiver 120 to write corresponding packet data into a history buffer of wireless receiver 120. The packet data may be sent over data channel 202 and may correspond to a single data packet or multiple data packets. The packet data may be compressed or uncompressed when it is transmitted in radio signal form. If the packet data is compressed, then wireless receiver 120 decompresses the packet data (e.g., by payload decompressor 270) based on one of history buffers 280 or 290 and writes the uncompressed packet data to a history buffer, such as payload history buffer 290.

Flush Instruction

In an embodiment, wireless receiver 120 also communicates information to wireless transmitter 110 over communication channel 204. An example of such information is a "flush instruction." A "flush instruction" indicates that history buffers maintained at wireless transmitter 110 should be flushed. In other words, the data stored in history buffers 240 and 250 should be deleted. The flush instruction may identify a certain history buffer (e.g., header history buffer 280) or may be applicable to multiple (or all) history buffers on wireless receiver 120.

A flush instruction may be sent from wireless receiver 120 to wireless transmitter 110 in response to wireless receiver 120 detecting an error. The error may occur due to a bit error, which is not uncommon in wireless networks. The error may result from wireless interference that causes otherwise accurate radio signals transmitted from wireless transmitter 110 to be altered sufficiently, such that, when the radio signals are received at wireless receiver 120 and converted into one or more (digital) data packets, the one or more data packets at wireless receiver 120 are different than the one or more data packets that were originally received at wireless transmitter 110 through network 130. An error may be detected by a CRC or a length check. If the CRC of a generated data packet at wireless receiver 120 does not match a CRC calculated by wireless receiver 120, then wireless receiver 120 presumes that an error resulted due to radio transmission In response to receiving a flush instruction, wireless transmitter 110 causes header history buffer 280 and/or payload history buffer 290 to be flushed or cleared. Wireless transmitter 110 may then refill history buffers 280 and 290 with data from one or more packets that are enqueued in one of transmit queues 210A-N or that have not yet been enqueued to any of transmit queues 210A-N when the flush instruction was received. The packet data that wireless transmitter 110 writes to one or more of history buffers 240 and 250 is uncompressed. The data packet(s) that correspond to the written packet data and that are transmitted (in radio signal form) to wireless receiver 120 are also uncompressed for at least N bytes where N is the length of the history buffer.

In addition to refilling one or more of history buffers 240 and 250, wireless transmitter 110 sends an update buffer instruction (e.g., over communication channel 204). In response to receiving the updated buffer instruction, wireless receiver 120 identifies the corresponding data packet(s) received from wireless transmitter 110 and writes the received (and uncompressed) packet data to one or more of history buffers 280 and 290. When enough bytes fill payload history buffer 290, then wireless transmitter 110 and wireless receiver 120 are said to be synchronized and compression may begin. Wireless receiver 120 may send a flush instruction to wireless transmitter 110 whenever a CRC error or length error is detected.

Example Process

Figure 3A:
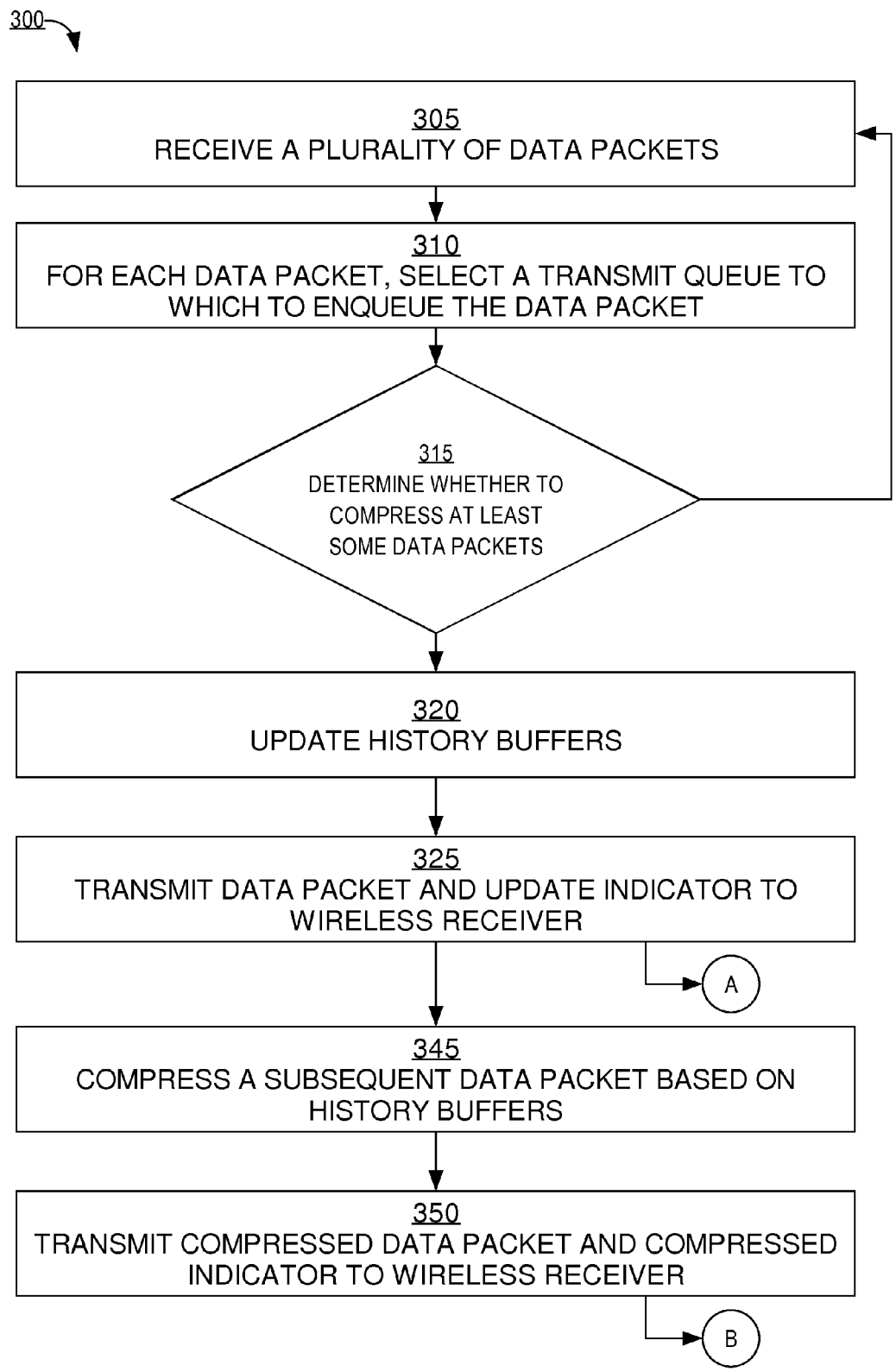
FIG. 3A-3B are flow diagrams that depicts a process for processing data packets, in an embodiment.
Figure 3B:
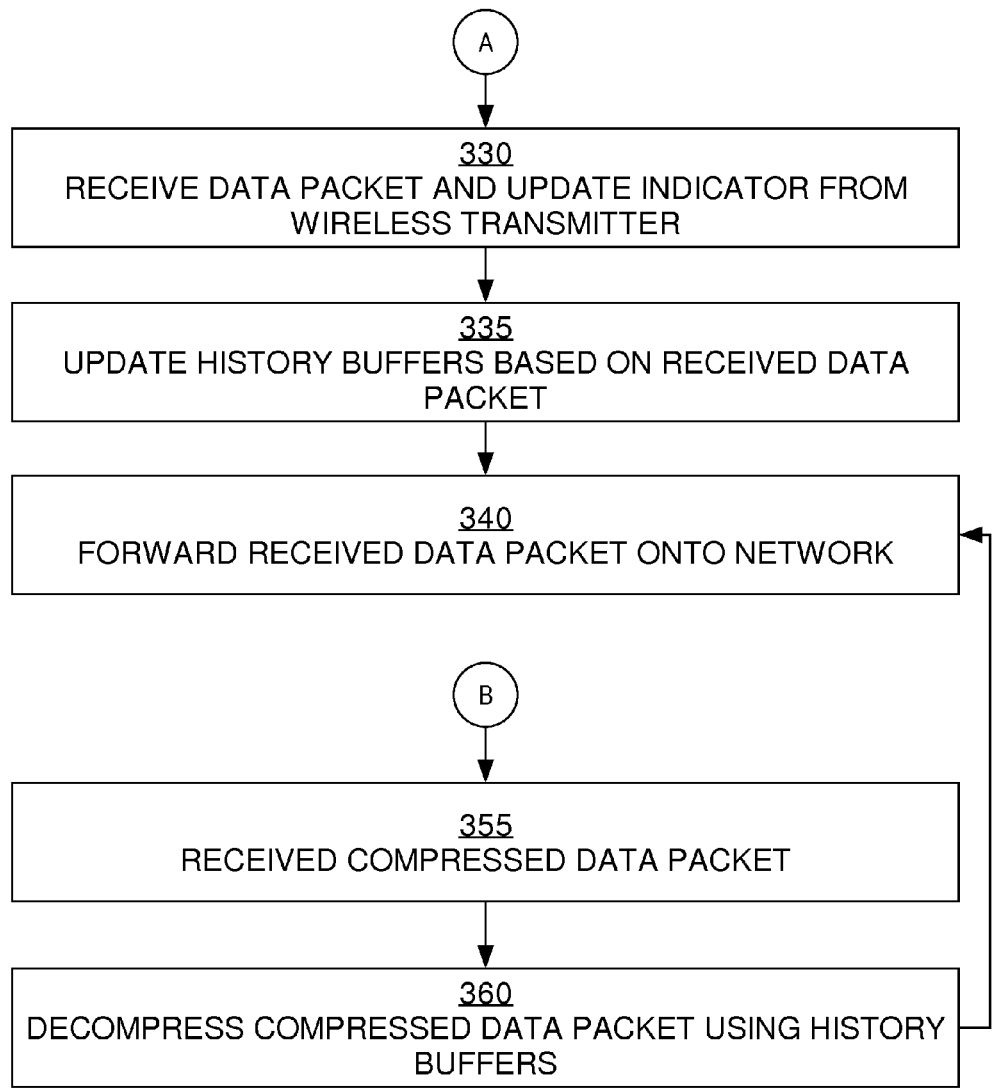

FIG. 3A-3B are flow diagrams that depicts a process 300 for processing data packets, in an embodiment. Process 300 includes blocks 305-360. Blocks 305-325 and 345-350 are performed by wireless transmitter 110 and blocks 330-340 and 355-360 are performed by wireless receiver 120.

At block 305, wireless transmitter 110 receives a plurality of data packets via network 130. Block 305 may be performed continuously while other blocks of process 300 are being performed. Additionally, block 305 may be performed while wireless transmitter 110 is in a "compressed state" or an "uncompressed state." In other words, block 305 may be performed while data compression is being performed for one or more transmit queues of wireless transmitter 110 or while no data compression is being performed.

At block 310, for each data packet of the plurality of data packets, wireless transmitter 110 selects a transmit queue from among transmit queues 210A-N to which to enqueue the data packet. The selection may be based on inspecting the data packet to determine a level of priority or a class of service associated with the data packet.

At block 315, wireless transmitter 110 determines whether one or more compression initiation criteria associated with one or more of transmit queues 210A-N is satisfied. This determination may be made continuously or periodically (e.g., every ten seconds) or in response to receiving data that indicates certain event(s) that have occurred. Thus, block 315 may be performed while wireless receiver 120 is performing one or more of blocks 330-340 and 355-360. Also, block 315 may be performed for each transmit queue (if multiple queues exist); thus, block 315 may be performed while wireless transmitter 110 is performing one or more of blocks 320, 325, 345, and 350.

At block 320, in response to determining that one or more compression initiation criteria associated with a transmit queue is satisfied, a header portion of a data packet in the transmit queue is written to header history buffer 240 and a payload portion of the data packet (and of zero or more other data packets in the transmit queue) is written to payload history buffer 250.

At block 325, wireless transmitter 110 converts the data packet into a radio signal and transmits the radio signal over data channel 202 to wireless receiver 120. Wireless transmitter 110 also transmits, over communication channel 204, a radio signal that includes an update indicator that indicates that the data packet reflected in the radio signal over data channel 202 is to be written to the appropriate history buffers of wireless receiver 120. This radio signal may also include an uncompressed indicator that indicates that the data packet reflected in the radio signal over data channel 202 is uncompressed.

At block 330, wireless receiver 120 converts the radio signal over data channel 202 into a data packet. Wireless receiver 120 also converts the radio signal over communication channel 204 to digital data that is analyzed to determine the update indicator and the uncompressed indicator.

At block 335, based on the update indicator, wireless receiver 120 writes the header portion of the received data packet to header history buffer 280 and writes the payload portion of the received data packet to payload history buffer 290.

At block 340, wireless receiver 120 forwards the received data packet towards its destination via network 140. Block 340 may involve wireless receiver 120 analyzing a header in the received data packet and a routing table to determine where to forward the received data packet. Alternatively, wireless receiver 120 may be coupled only to a single device of network 140, which device may be responsible for analyzing headers and forwarding received data packets from wireless receiver 120.

At block 345, wireless transmitter 110 compresses a subsequent data packet (dequeued from a transmit queue) using the header data written in header history buffer 220 and the payload data written in payload history buffer 230.

At block 350, wireless transmitter 110 converts the compressed data packet into a radio signal and transmits the radio signal over data channel 202 to wireless receiver 120. Block 355 may also involve wireless transmitter 110 transmitting, over communication channel 204, a radio signal that includes a compressed indicator that indicates that a corresponding data packet is compressed.

At block 355, wireless receiver 120 receives the radio signal over data channel 202 and converts the radio signal into a compressed data packet.

At block 360, wireless receiver 120 decompresses the compressed data packet using data written to header history buffer 280 and data written to payload history buffer 290. Process 300 proceeds to block 340 where wireless receiver 120 forwards the uncompressed data packet via network 140.

Although process 300 is depicted and described as occurring in a certain order, embodiments are not limited to that order. For example, block 350 may occur prior to block 340.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
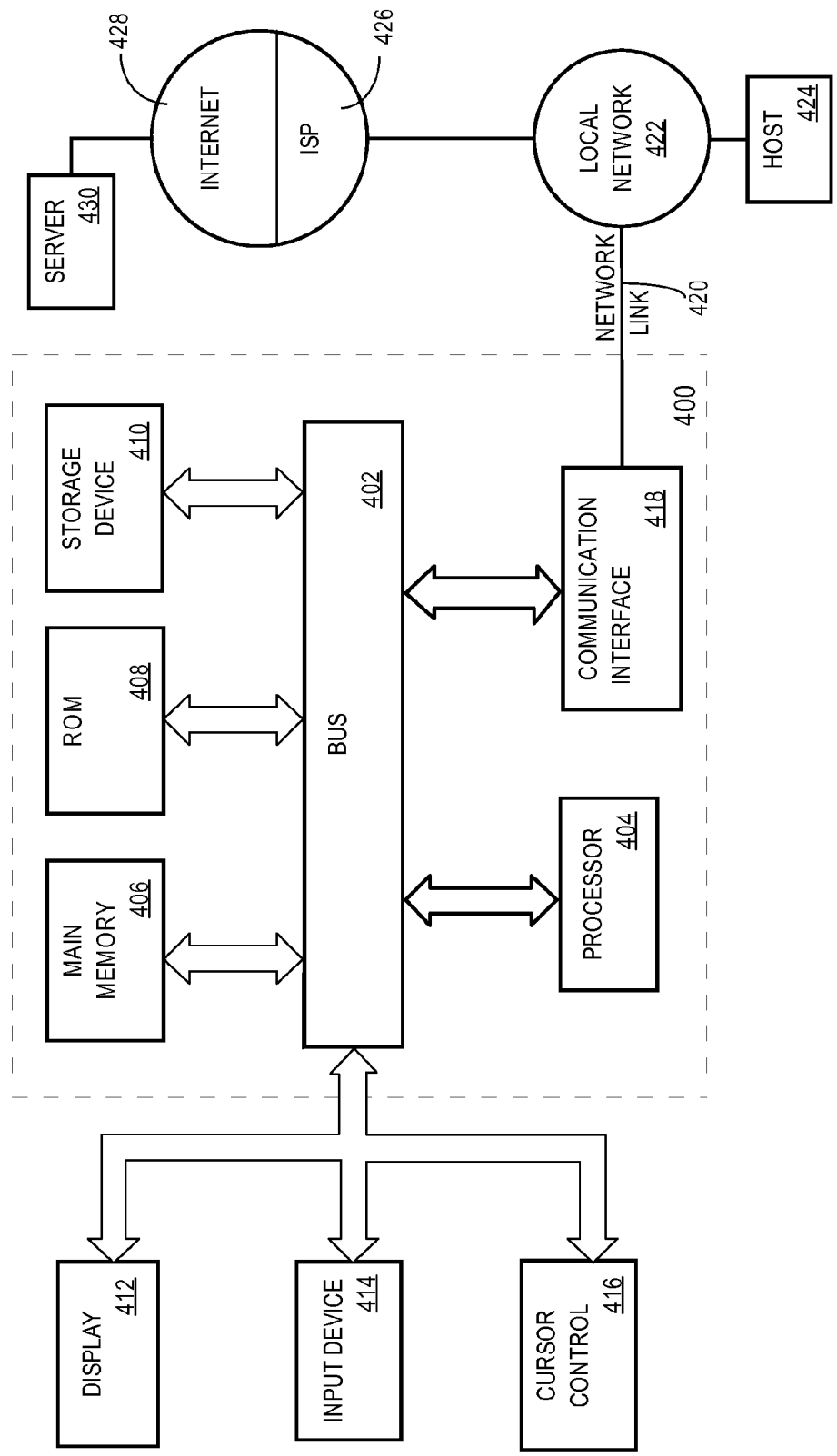
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   prior to retrieving a first set of one or more data packets to be wirelessly transmitted to a wireless receiver:
      storing a plurality of data packets across a plurality of different queues including a first queue and a second queue;
      wherein the first queue stores first data packets for transmission to the wireless receiver and is associated with a first set of one or more compression criteria;
      wherein the second queue stores second data packets for transmission to the wireless receiver and is associated with a second set of one or more compression criteria;
      wherein the first set of one or more compression criteria associated with the first queue is different than the second set of one or more compression criteria associated with the second queue;
   retrieving the first set of one or more data packets to be wirelessly transmitted to the wireless receiver;
   determining whether the first set of one or more data packets was retrieved from the first queue of the plurality of queues or the second queue of the plurality of queues;
   in response to determining that the first set of one or more data packets was retrieved from the first queue of the plurality of queues:
      retrieving the first set of one or more compression criteria associated with the first queue;
      before wirelessly transmitting the first set of one or more data packets to the wireless receiver, determining, based on the first set of one or more compression criteria associated with the first queue, whether to compress data in the first set of one or more data packets;
      in response to determining to compress data in the first set of one or more data packets based on the first set of one or more compression criteria associated with the first queue:
         compressing first data in the first set of one or more data packets to generate compressed first data;
         generating a first radio signal that represents the compressed first data;
         transmitting the first radio signal to the wireless receiver.

2. The method of claim 1, further comprising:
   in response to determining to compress data in the first set of one or more data packets based on the first set of one or more compression criteria associated with the first queue, entering a compression state;
   after entering the compression state and compressing the first data, determining, based on the first set of one or more compression criteria associated with the first queue, whether to cease compressing data in the first set of one or more data packets;
   in response to determining to cease compressing data in the first set of one or more data packets based on the first set of one or more compression criteria associated with the first queue, entering a non-compression state and ceasing to compress data that would have been compressed if the current state was the compression state.

3. The method of claim 1, further comprising, prior to retrieving the first set of one or more data packets form the queue:
   determining a level of importance of the first data;
   if the level of importance of the first data is a first level, then inserting the first data into the first queue;
   if the level of importance of the first data is a second level, then inserting the first data into the second queue;
   wherein data that is associated with a relatively higher level of priority is inserted into the second queue;
   wherein data that is associated with a relatively lower level of priority is inserted into the first queue.

4. The method of claim 3, further comprising compressing data that is retrieved from the first queue while not compressing data that is retrieved from the second queue.

5. The method of claim 1, wherein the determining, based on the first set of one or more compression criteria associated with the first queue, whether to compress data in the first set of one or more data packets comprises comparing a first throughput of receiving data packets to a second throughput of transmitting radio signals; wherein data is compressed before transmission to the wireless receiver if a threshold is satisfied; wherein data is uncompressed when transmitted to the wireless receiver if the threshold is not satisfied.

6. The method of claim 1, wherein determining, based on the first set of one or more compression criteria associated with the first queue, whether to compress data in the first set of one or more data packets comprises determining an amount of data that is contained in the first queue and zero or more other queues or a number of data packets that are contained in the first queue and zero or more other queues; wherein data is compressed before transmission to the wireless receiver if the amount of data or the amount of data packets satisfies a threshold; wherein data is uncompressed when transmitted to the wireless receiver if the threshold is not satisfied.

7. The method of claim 1, wherein:
   the first data is a first data packet that comprises a header portion and a payload portion;
   compressing the first data comprises compressing the payload portion of the first data packet without compressing the header portion of the first data packet.

8. The method of claim 1, wherein:
   the first data is a first data packet that comprises a header portion and a payload portion;
   compressing the first data comprises compressing the header portion of the first data packet while not compressing the payload portion of the first data;
   the compressed first data includes a compressed version of the header portion and an uncompressed version of the payload portion.

9. The method of claim 1, wherein:
the first data is a first data packet that comprises a header portion and a payload portion;
compressing the first data comprises compressing the header portion of the first data packet using a first compression technique and compressing the payload portion of the first data packet using a second compression technique.

10. The method of claim 1, further comprising, storing data in a history buffer at a wireless transmitter that performs the step of transmitting, wherein compressing the first data comprises using the data stored in the history buffer to generate the compressed first data.

11. The method of claim 10, further comprising, transmitting data that is associated with a second radio signal and that indicates whether data represented by the second radio signal is to be used in a history buffer of the wireless receiver.

12. The method of claim 1, further comprising, transmitting data that is associated with a second radio signal and that indicates whether the second radio signal represents data that is compressed.

13. The method of claim 1, further comprising:
receiving, from the wireless receiver, data that indicates that an error occurred in transmission of the first radio signal to the wireless receiver;
in response to receiving the data that indicates the error, updating a history buffer with a set of data that has a length that is greater than or equal to a length of the history buffer without compressing the set of data.

14. One or more non-transitory storage media storing one or more instructions which, when executed by one or more hardware processors, cause operations comprising: prior to retrieving a first set of one or more data packets to be wirelessly transmitted to a wireless receiver: storing a plurality of data packets across a plurality of different queues including a first queue and a second queue; wherein the first queue stores first data packets for transmission to the wireless receiver and is associated with a first set of one or more compression criteria; wherein the second queue stores second data packets for transmission to the wireless receiver and is associated with a second set of one or more compression criteria; wherein the first set of one or more compression criteria associated with the first queue is different than the second set of one or more compression criteria associated with the second queue; retrieving the first set of one or more data packets to be wirelessly transmitted to the wireless receiver; determining whether the first set of one or more data packets was retrieved from the first queue of the plurality of queues or the second queue of the plurality of queues; in response to determining that the first set of one or more data packets was retrieved from the first queue of the plurality of queues: retrieving the first set of one or more compression criteria associated with the first queue; before wirelessly transmitting the first set of one or more data packets to the wireless receiver, determining, based on the first set of one or more compression criteria associated with the first queue, whether to compress data in the first set of one or more data packets; in response to determining to compress data in the first set of one or more data packets based on the first set of one or more compression criteria associated with the first queue: compressing first data in the first set of one or more data packets to generate compressed first data; generating a first radio signal that represents the compressed first data; transmitting the first radio signal to the wireless receiver.

15. The one or more non-transitory storage media of claim 14, further storing instructions which, when executed by one or more hardware processors, cause operations comprising:
in response to determining to compress data in the first set of one or more data packets based on the first set of one or more compression criteria associated with the first queue, entering a compression state;
after entering the compression state and compressing the first data, determining, based on the first set of one or more compression criteria associated with the first queue, whether to cease compressing data in the first set of one or more data packets;
in response to determining to cease compressing data in the first set of one or more data packets based on the first set of one or more compression criteria associated with the first queue, entering a non-compression state and ceasing to compress data that would have been compressed if the current state was the compression state.

16. The one or more non-transitory storage media of claim 14, further storing instructions which, when executed by one or more hardware processors, cause operations comprising:
determining a level of importance of the first data;
if the level of importance of the first data is a first level, then inserting the first data into the first queue;
if the level of importance of the first data is a second level, then inserting the first data into the second queue;
wherein data that is associated with a relatively higher level of priority is inserted into the second queue;
wherein data that is associated with a relatively lower level of priority is inserted into the first queue.

17. The one or more non-transitory storage media of claim 16, further storing instructions which, when executed by one or more hardware processors, cause operations comprising compressing data that is retrieved from the first queue while not compressing data that is retrieved from the second queue.

18. The one or more non-transitory storage media of claim 14, wherein instructions for determining based on the first set of one or more compression criteria associated with the first queue, whether to compress data in the first set of one or more data packets comprise instructions for comparing a first throughput of receiving data packets to a second throughput of transmitting radio signals; wherein data is compressed before transmission to the wireless receiver if a threshold is satisfied; wherein data is uncompressed when transmitted to the wireless receiver if the threshold is not satisfied.

19. The one or more non-transitory storage media of claim 14, wherein instructions for determining based on the first set of one or more compression criteria associated with the first queue, whether to compress data in the first set of one or more data packets comprise instructions for determining an amount of data that is contained in the first queue and zero or more other queues or a number of data packets that are contained in the first queue and zero or more other queues; wherein data is compressed before transmission to the wireless receiver if the amount of data or the amount of data packets satisfies a threshold; wherein data is uncompressed when transmitted to the wireless receiver if the threshold is not satisfied.

20. The one or more non-transitory storage media of claim 14, wherein:
the first data is a first data packet that comprises a header portion and a payload portion;

instructions for compressing the first data comprise instructions for compressing the header portion of the first data packet while not compressing the payload portion of the first data;

the compressed first data includes a compressed version of the header portion and an uncompressed version of the payload portion.

\* \* \* \* \*